(12) United States Patent
Childs

(10) Patent No.: US 8,087,614 B2
(45) Date of Patent: Jan. 3, 2012

(54) STRINGER FOR AN AIRCRAFT WING AND A METHOD OF FORMING THEREOF

(75) Inventor: Thomas Childs, Bristol (GB)

(73) Assignee: Airbus Operations Limited, Bristol (GB)

(*) Notice: Subject to any disclaimer, the term of this patent is extended or adjusted under 35 U.S.C. 154(b) by 451 days.

(21) Appl. No.: 12/300,355

(22) PCT Filed: May 23, 2007

(86) PCT No.: PCT/GB2007/001927
§ 371 (c)(1),
(2), (4) Date: Nov. 11, 2008

(87) PCT Pub. No.: WO2007/144563
PCT Pub. Date: Dec. 21, 2007

(65) Prior Publication Data
US 2010/0230542 A1    Sep. 16, 2010

(30) Foreign Application Priority Data

Jun. 15, 2006 (GB) .................................. 0611875.6

(51) Int. Cl.
B64C 1/00 (2006.01)
(52) U.S. Cl. ..................................... 244/123.8; 244/119
(58) Field of Classification Search ............... 244/123.1, 244/123.7, 123.8, 123.9, 118.1, 117 R
See application file for complete search history.

(56) References Cited

U.S. PATENT DOCUMENTS

| 1,743,327 | A  |   | 9/1926  | Dornier |
| 3,034,608 | A  | * | 5/1962  | Dengler ........................... 52/836 |
| 5,348,601 | A  | * | 9/1994  | Ray ................................... 156/155 |
| 5,527,414 | A  | * | 6/1996  | Dublinski et al. ............. 156/245 |
| 5,624,622 | A  | * | 4/1997  | Boyce et al. .................... 264/258 |
| 5,632,940 | A  | * | 5/1997  | Whatley ......................... 264/46.4 |
| 6,003,812 | A  |   | 12/1999 | Micale et al. |
| 6,170,157 | B1 | * | 1/2001  | Munk et al. .................... 29/897.2 |
| 6,510,961 | B1 | * | 1/2003  | Head et al. ..................... 220/645 |
| 7,708,224 | B2 | * | 5/2010  | Aho-Mantila et al. ........... 244/54 |
| 7,716,835 | B2 | * | 5/2010  | Johnson et al. ............... 29/897.2 |
| 7,740,202 | B2 | * | 6/2010  | Namaizawa et al. ....... 244/123.1 |
| 7,861,969 | B2 | * | 1/2011  | Guzman et al. ............... 244/120 |
| 2002/0178992 | A1 | * | 12/2002 | Lewit ............................. 114/357 |
| 2003/0192990 | A1 | * | 10/2003 | Simpson et al. .............. 244/123 |
| 2004/0035981 | A1 | * | 2/2004  | Nunn et al. ................... 244/123 |
| 2005/0003145 | A1 | * | 1/2005  | Toi et al. ....................... 428/102 |
| 2006/0145010 | A1 | * | 7/2006  | Schmidt et al. ............. 244/123.8 |

(Continued)

FOREIGN PATENT DOCUMENTS

EP    0829552 A1    3/1998

(Continued)

OTHER PUBLICATIONS

GB Search Report for 0611875.6 dated Oct. 12, 2006.

(Continued)

*Primary Examiner* — Joshua Michener
*Assistant Examiner* — Medhat Badawi
(74) *Attorney, Agent, or Firm* — Lowe, Hauptman, Ham & Berner, LLP

(57) ABSTRACT

The present invention relates to a stringer for an aircraft wing and a method of forming such a stringer in which the stringer is formed form a single piece of material and has differential strength along its length.

21 Claims, 3 Drawing Sheets

U.S. PATENT DOCUMENTS

| | | | |
|---|---|---|---|
| 2006/0226287 A1* | 10/2006 | Grantham et al. | 244/119 |
| 2006/0249626 A1* | 11/2006 | Simpson et al. | 244/123.1 |
| 2008/0128552 A1* | 6/2008 | Namaizawa et al. | 244/123.1 |
| 2008/0223987 A1* | 9/2008 | Halme et al. | 244/123.1 |
| 2009/0121082 A1* | 5/2009 | Godenzi et al. | 244/123.1 |
| 2009/0206203 A1* | 8/2009 | Crawford | 244/123.7 |
| 2009/0314892 A1* | 12/2009 | Kunichi et al. | 244/123.1 |
| 2010/0025529 A1* | 2/2010 | Perry et al. | 244/117 R |
| 2011/0011975 A1* | 1/2011 | Boursier et al. | 244/118.1 |
| 2011/0073763 A1* | 3/2011 | Subbarao | 250/362 |

FOREIGN PATENT DOCUMENTS

| | | |
|---|---|---|
| GB | 125748 | 4/1919 |
| GB | 399555 | 10/1933 |
| GB | 478855 | 1/1938 |
| GB | 500076 | 2/1939 |
| GB | 508992 | 7/1939 |
| GB | 532603 | 1/1941 |
| GB | 724753 | 2/1955 |
| WO | 0117721 A1 | 3/2001 |
| WO | 0210013 A1 | 2/2002 |

OTHER PUBLICATIONS

ISR and Written Opinion for PCT/GB2007/001927 dated Sep. 7, 2007.

* cited by examiner

STRINGER FOR AN AIRCRAFT WING AND A METHOD OF FORMING THEREOF

RELATED APPLICATIONS

The present application is based on International Application Number PCT/GB2007/001927 filed May 23, 2007, and claims priority from British Application Number 0611875.6 filed Jun. 15, 2006, the disclosures of which are hereby incorporated by reference herein in their entirety.

FIELD OF THE INVENTION

The present invention relates to a stringer for an aircraft wing and a method of forming such a stringer.

BACKGROUND OF THE INVENTION

The core of an aircraft wing is a section called a wing box. The wing box is fared into the aircraft fuselage and runs from the root towards the tip of the wing. The wing box provides the central sections of the upper and lower aerofoil surfaces for the wing in addition to attachment points for engines and control surfaces such as ailerons, trim flaps and airbrakes. The aerofoil surfaces of the wing box are provided by panels referred to as wing covers. The wing covers include a number of structural elements called stringers, which run within the wing box structure from the root towards the tip. The stringers are arranged to provide the necessary structural stability and integrity to enable the wing covers to cope with the operational loads on the wing.

When building aircraft structures, one of many considerations is the balance between weight and strength. In other words, structures need to be as light as possible while providing the necessary strength and structural integrity to perform properly under operational loads. The loads on a wing vary along its span and typically reduce towards the wing tip. Therefore, stringers can be built to have strength that varies along their length, thus reducing their overall weight. Stringers are commonly created by joining or splicing stringer sections, each section having weight characteristics tailored to its expected loading. Alternatively, a single stringer can be provided and machined to a varying degree along the span so as to reduce unnecessary weight.

A problem with splicing or joining sections of stringer is that it adds extra weight and complexity to the wing box. A problem with machining a single stringer is that the amount by which the stringer can be modified is limited.

SUMMARY OF THE INVENTION

An embodiment of the invention provides a stringer for an aircraft wing comprising:
two spaced apart flanges for attachment to a wing cover panel, the flanges having opposing inner ends;
two side panels each integral with a respective one of the inner ends of the flanges and extending away from the flanges in converging planes;
a top panel arranged in a plane generally parallel to the flanges and being integral with and inter joining the side panels; and
at least one of the side panels being perforated to form a set of holes spaced along the length of the stringer.

The volume of the holes may vary along the stringer. The volume of the holes may increase towards the wing tip end of the stringer. The volume of the holes may decrease around a point input load to the stringer. The holes may be centred along a straight line. The holes may be centred along a curved line. Both the side panels may be perforated. The set of holes in each side panel may have the same size and configuration. The holes may be circular. The centres of the holes may be evenly spaced apart.

Another embodiment provides a method for creating a stringer for an aircraft wing comprising the steps of:
a) forming a stringer blank having:
a pair of spaced apart flanges for attachment to a wing cover panel, the flanges having opposing inner ends; a pair of side panels each integral with a respective one of an inner end of the flanges and extending away from the flanges in converging planes;
a top panel arranged in a plane generally parallel to the flanges and being integral with and inter joining the side panels; and
b) perforating at least one of the side panels to form a set of holes spaced along the length of the stringer.

The stringer blank may be formed by extrusion. The stringer blank may be formed from a metal or a metal alloy.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
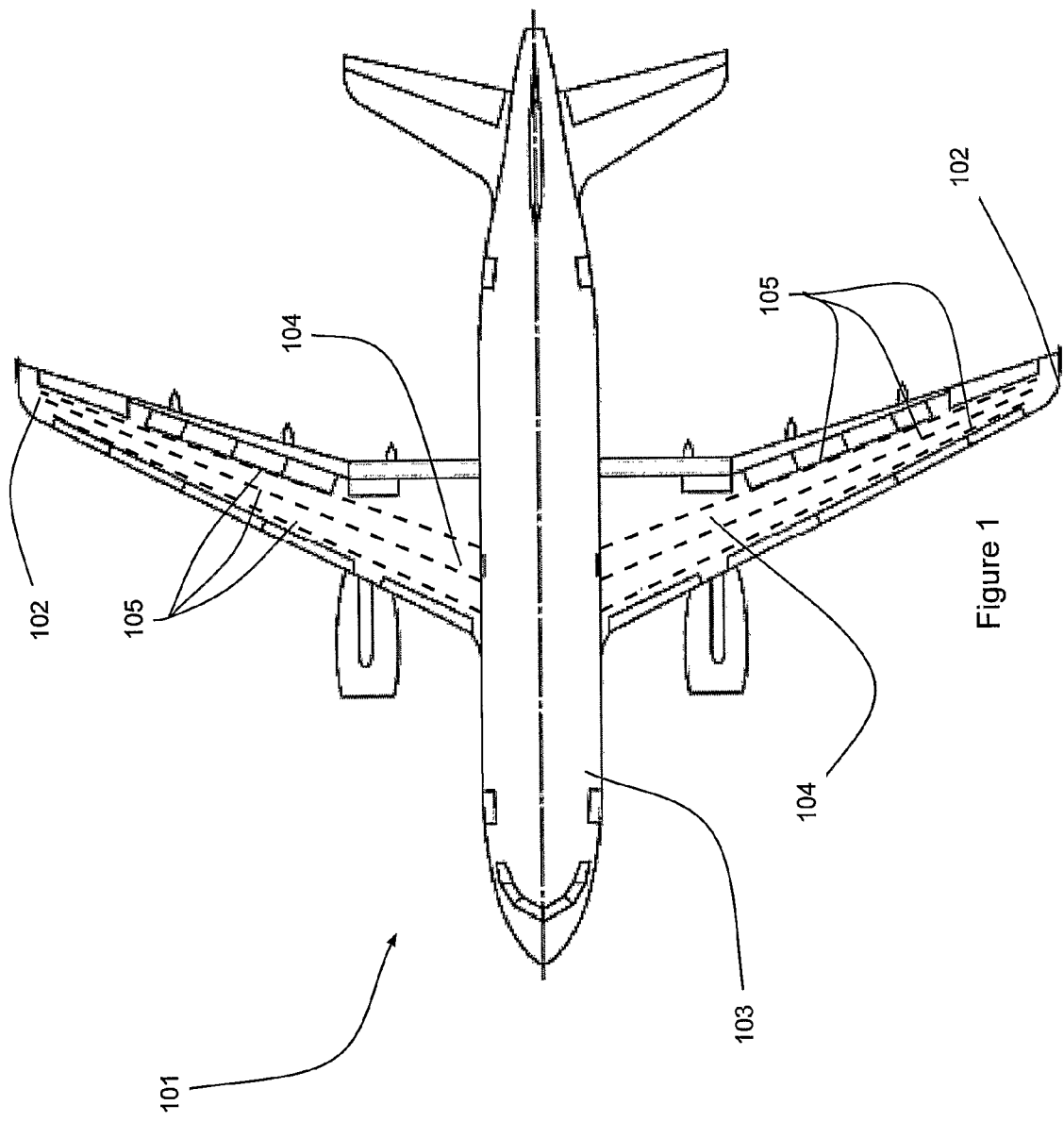
FIG. 1 is a plan view of an aircraft.

With reference to FIG. 1, an aircraft 101 comprises wings 102 attached to a fuselage 103. The wings 102 comprise a central structural element 104 in the form of a wing box. The wing box 104 runs from the root to the tip of each wing 102 and between the leading and trailing edges of the wing. The wing box 104 comprises a number of structural elements 105 in the form of stringers, which run from the root to the tip of each wing box 104.

Figure 2:
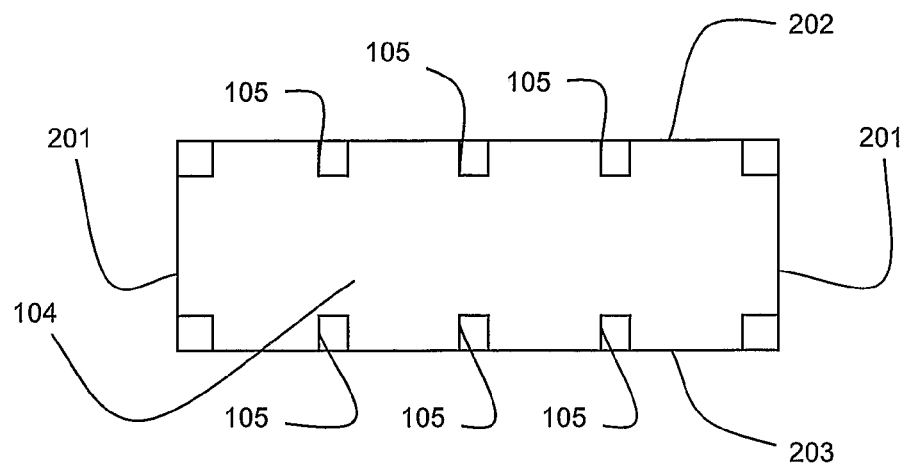
FIG. 2 is a cross-sectional view of a wing box of the aircraft of FIG. 1.

With reference to FIG. 2, the wing box 104 is constructed from two side members 201 in the form of spars, which provide attachment points for the leading and trailing edge structures (not shown) of the wing 102. The upper and lower surfaces 202, 203 of the wing box 104 are each formed from wing cover panels, which provide the upper and lower aerofoil surfaces of the wing 102. The stringers 105 are attached to the interior surface of the wing cover panels 202, 203.

Figure 3:
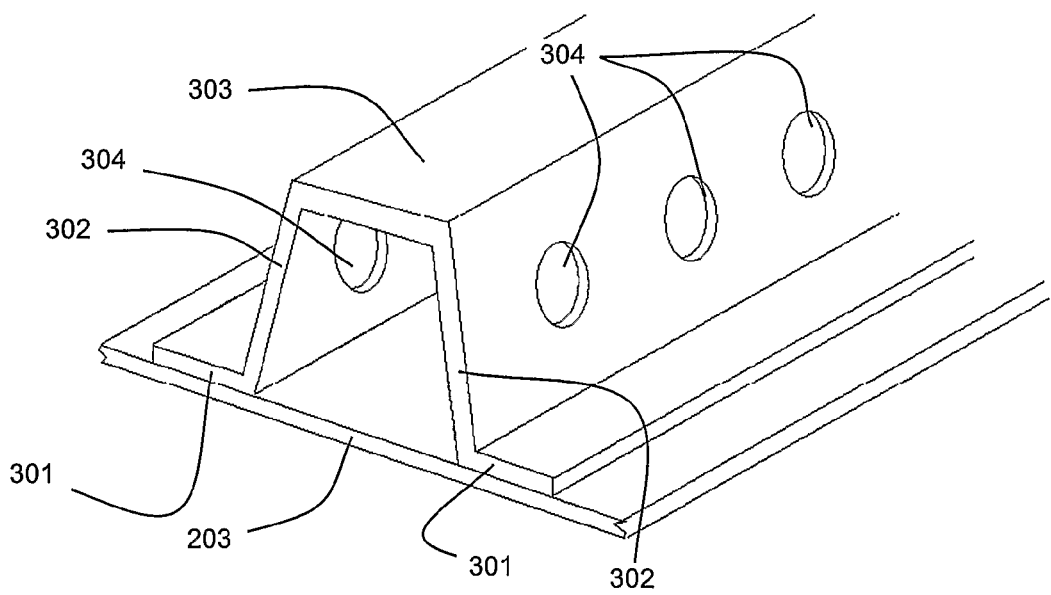
FIG. 3 shows a side perspective view of a stringer in the wing box of FIG. 2.

With reference to FIG. 3, the stringers 105 are formed by extruding blank stringers from aluminium alloy. The blank stringers have two spaced apart attachment members 301 in the form of flanges for providing attachment points to a wing cover 203. Side panels 302 extend away from the interior ends of the flanges 301 in converging planes. The side panels 302 are joined by a top panel 303, which forms a crown to the stringer blank cross-section. Since the stringer blanks are extruded, the flanges 301, side panels 302 and crown 303 are integrally formed. The finished stringer 105 is produced by machining holes 304 in the side panels 302 of the blank stringer to remove amounts of material along its length. The holes 304 serve to minimize the weight of the stringer, while the pattern and size of the holes 304 are designed to tailor to the structural integrity imparted by the stringer 105 along the length of an attached wing cover panel.

Figure 4:
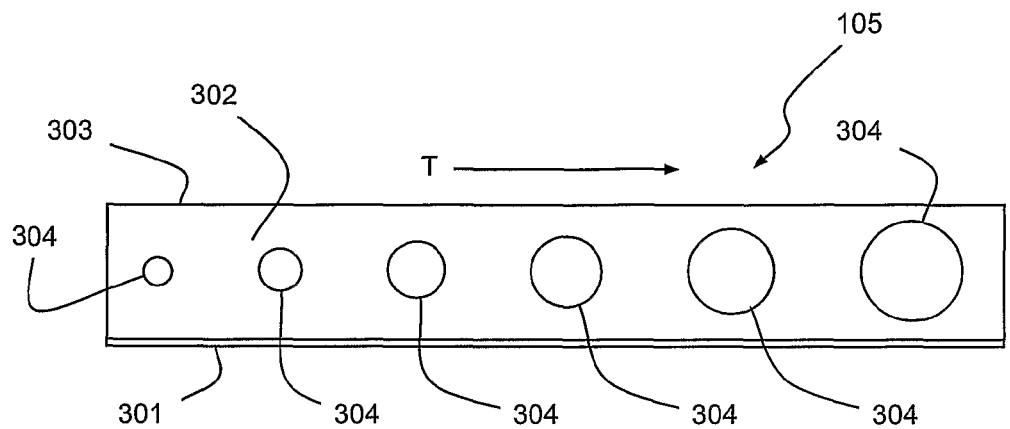
FIG. 4 shows a side view of the stringer of FIG. 3.

In the stringer of FIG. 3, the size of the holes 304 increases in the direction of the wing tip end of the stringer 105 indicated by arrow T. The pattern of the holes is such that their edges are equally spaced from each other and their centres are aligned on a straight line substantially parallel to the plane of attachment with the wing cover 203 as shown in FIG. 4. Thus, a wing panel attached to the stringer 105 would have a relatively high load capacity at its end near the wing root and progressively less capacity in the direction T towards the wing tip end. The holes 304 remove increasing amounts of material from the side panels 302 in the direction T, thus minimising the weight of the wing box.

Figure 5:
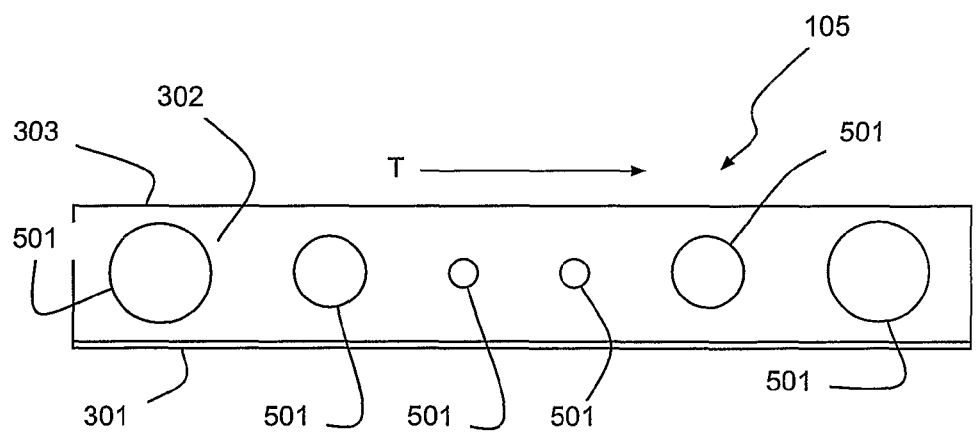
FIG. 5 shows a side view of a stringer in another embodiment.

In another embodiment shown in FIG. 5, the stringer 105 has a set of holes 501 formed in its side panels 302, which are relatively large at the wing root end and then reduce in size before becoming relatively large again towards the wing tip end of the stringer 105. The central portion of the stringer where the holes 501 are smaller will thus provide greater structural integrity to an attached wing panel so as to enable additional loading in the central part of the wing. This may be required, for example, to provide an attachment point for an engine or other equipment where there is a point input load to the stringer.

In another embodiment, the holes are centred along a curved line in the plane of the side panels. In a further embodiment, the holes are centred on a line converging with the plane of the wing cover. In another embodiment, the holes are of constant size or area or volume. In a further embodiment, the holes are spaced apart by varying distances. In another embodiment, the area or volume or spacing of the holes is modified around a load point in the stringer. In a further embodiment, the sets of holes are the same in each side panel but staggered relative to each other. Such staggering facilitates the attachment of items to the stringer such as rib cleats, which can be attached without using blind fastenings. In another embodiment, the holes are non-circular. For example, the holes may be ovoid, triangular, rhomboid or other polyhedral shape. In a further embodiment, the holes are provided in only a part of one of the side panels for at least a part of the stringer.

The holes provided in the embodiments of the invention also enable inspection of the interior surfaces of the stringer and otherwise concealed sections of wing cover. Furthermore, the holes provide ventilation for the otherwise enclosed space. Lack of such ventilation can lead to corrosion. The controlling or modifying the performance of a stringer in the manner described reduces the size of the extrusion envelope required to form the stringer. This therefore reduces the material required to produce a stringer when compared to a manufacture processes in which the cross section of an extruded stringer is modified.

As will be understood by those skilled in the art, machining of the stringer blank may be carried out by any suitable process such as milling, etching, abrading, punching or drilling. Furthermore, the stringers may be formed from any suitable material such as a metal, metal alloy or other suitable non-metallic material.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A stringer for an aircraft wing comprising:
   two spaced apart flanges for attachment to a wing cover panel, said flanges having opposing inner ends;
   two side panels each integral with a respective one of said inner ends of said flanges and extending away from said flanges in converging planes;
   a top panel arranged in a plane substantially parallel to said flanges and being integral with and interjoining said side panels; and
   at least one of said side panels being perforated to form a set of holes spaced along the length of the stringer, wherein the size of said holes increases in a direction from the wing root end to the wing tip end of the stringer to tailor the load capacity of the stringer along the length of said stringer.

2. A stringer according to claim 1 in which the volume of said holes decreases around a point input load to the stringer.

3. A stringer according to claim 1 in which said holes are centred along a straight line.

4. A stringer according to claim 1 in which said holes are centred along a curved line.

5. A stringer according to claim 1 in which both said side panels are perforated.

6. A stringer according to claim 5 in which said set of holes in each said side panel have the same size and configuration.

7. A stringer according to claim 1 in which said holes are circular.

8. A stringer according to claim 1 in which the centres of said holes are evenly spaced apart.

9. A stringer according to claim 1 in which the relative spacing of said holes varies along the stringer.

10. A method for creating a stringer for an aircraft wing comprising the steps of:
    a) forming a stringer blank having:
       a pair of spaced apart flanges for attachment to a wing cover panel, said flanges having opposing inner ends; a pair of side panels each integral with a respective one of an inner end of said flanges and extending away from said flanges in converging planes;
       a top panel arranged in a plane substantially parallel to said flanges and being integral with and interjoining said side panels; and
    b) perforating at least one of said side panels to form a set of holes spaced along the length of the stringer, wherein the size of said holes increases in a direction from the wing root end to the wing tip end of the stringer to tailor the load capacity of the stringer along the length of said stringer.

11. A method according to claim 10 in which said holes are centred along a straight line.

12. A method according to claim 10 in which said holes are centred along a curved line.

13. A method according to claim 10 in which both said side panels are perforated.

14. A method according to claim 13 in which said set of holes in each said side panel have the same size and configuration.

15. A method according to claim 10 in which said holes are circular.

16. A method according to claim 10 in which the centres of said holes are evenly spaced apart.

17. A method according to claim 10 in which said stringer blank is formed by extrusion.

18. A method according to claim 10 in which said stringer blank is formed from a metal or a metal alloy.

19. A method according to claim 10 in which the relative spacing of said holes varies along the stringer.

20. A stringer for an aircraft wing comprising:

two spaced apart flanges for attachment to a wing cover panel, said flanges having opposing inner ends;

two side panels each integral with a respective one of said inner ends of said flanges and extending away from said flanges in converging planes;

a top panel arranged in a plane substantially parallel to said flanges and being integral with and interjoining said side panels; and at least one of said side panels being perforated to form a set of holes spaced along the length of the stringer, wherein the size of said holes are larger at the wing root end and the wing tip end than the size of the holes therebetween.

21. A method for creating a stringer for an aircraft wing comprising the steps of:

a) forming a stringer blank having:

a pair of spaced apart flanges for attachment to a wing cover panel, said flanges having opposing inner ends; a pair of side panels each integral with a respective one of an inner end of said flanges and extending away from said flanges in converging planes;

a top panel arranged in a plane substantially parallel to said flanges and being integral with and interjoining said side panels; and b) perforating at least one of said side panels to form a set of holes spaced along the length of the stringer, wherein the size of said holes are larger at the wing root end and the wing tip end than the size of the holes therebetween.

* * * * *